(12) United States Patent
Vouche et al.

(10) Patent No.: US 9,383,141 B2
(45) Date of Patent: *Jul. 5, 2016

(54) APPARATUS AND METHOD FOR AN AIR BYPASS SYSTEM FOR A NATURAL DRAFT COOLING TOWER

(71) Applicant: SPX Cooling Technologies, Inc., Overland Park, KS (US)

(72) Inventors: Michel Vouche, Brussels (BE); Eldon Mockry, Lenexa, KS (US)

(73) Assignee: SPX Dry Cooling USA LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,272

(22) Filed: Aug. 15, 2014

(65) Prior Publication Data

US 2014/0353857 A1 Dec. 4, 2014

Related U.S. Application Data

(63) Continuation of application No. 12/728,672, filed on Mar. 22, 2010, now Pat. No. 8,876,090.

(51) Int. Cl.
| | | |
|---|---|---|
| *F28B 1/06* | (2006.01) | |
| *F28C 1/00* | (2006.01) | |
| *F28C 1/14* | (2006.01) | |
| *F28F 25/12* | (2006.01) | |

(52) U.S. Cl.
CPC ... *F28C 1/00* (2013.01); *F28B 1/06* (2013.01); *F28C 1/14* (2013.01); *F28F 25/12* (2013.01); Y10S 261/11 (2013.01)

(58) Field of Classification Search
CPC ............... F28B 1/06; F28C 1/00; F28C 1/14; F28F 25/12; Y10S 261/11
USPC ............. 261/54, 63, 128, 133, 146, 156, 157, 261/159, DIG. 11
See application file for complete search history.

(56) References Cited

U.S. PATENT DOCUMENTS

| | | |
|---|---|---|
| 3,488,960 A | 1/1970 | Kirkpatrick |
| 3,495,655 A | 2/1970 | Fordyce |
| 3,498,590 A | 3/1970 | Furlong |
| 3,592,122 A | 7/1971 | Hughes |
| 3,776,306 A | 12/1973 | Michel |
| 3,851,702 A | 12/1974 | Heller et al. |
| 3,923,935 A | 12/1975 | Cates |
| 3,965,672 A | 6/1976 | Stephens |
| 4,020,899 A | 5/1977 | Langerock |
| 4,031,173 A | 6/1977 | Rogers |

(Continued)

FOREIGN PATENT DOCUMENTS

| | | |
|---|---|---|
| CN | 1844824 | 10/2006 |
| CN | 1847765 A | 10/2006 |

OTHER PUBLICATIONS

Second Office Action issued Jul. 14, 2014.

(Continued)

*Primary Examiner* — Charles Bushey
(74) *Attorney, Agent, or Firm* — Baker & Hostetler LLP

(57) ABSTRACT

The present invention relates to an apparatus and method for an air bypass system for a natural draft cooling tower that employs a wet heat exchanger, a direct dry heat exchanger or an indirect dry heat exchanger to extract heat from a heated fluid, which is usually liquid or steam.

15 Claims, 17 Drawing Sheets

(56) References Cited

U.S. PATENT DOCUMENTS

| | | | |
|---|---|---|---|
| 4,397,793 | A | 8/1983 | Stillman et al. |
| 4,446,914 | A | 5/1984 | Russell |
| 4,514,344 | A | 4/1985 | Ruscheweyh |
| 4,662,902 | A | 5/1987 | Meyer-Pittroff |
| 4,691,766 | A | 9/1987 | Wurz et al. |
| 5,129,456 | A | 7/1992 | Bodas et al. |
| 5,449,036 | A | 9/1995 | Genge et al. |
| 5,590,478 | A | 1/1997 | Furness |
| 6,499,728 | B2 | 12/2002 | Menzel et al. |
| 7,086,823 | B2 | 8/2006 | Michaud |
| 8,235,365 | B2 | 8/2012 | Schrey |
| 8,707,699 | B2 * | 4/2014 | Badin ................. F28D 1/04 165/128 |
| 8,876,090 | B2 * | 11/2014 | Vouche ................ F28B 1/06 261/128 |

OTHER PUBLICATIONS

First Office Action issued Apr. 3, 2014.

Journal of STEM Education, vol. 6, Issue 3&4, Jul.-Dec. 2005, Justin Cockrin, P.K. Raju, and Chetan Sankar, in Hot Water: A Cooling Tower Case Study, pp. 41-62 Useful background material to aid in the understanding of the invention.

The Chemical Engineers' Resource Page, http://www.cheresources.com/ctowerszz.shtml, Dec. 2009, Cooling Towers: Design and Operation Considerations Useful background material to aid in the understanding of the invention.

\* cited by examiner

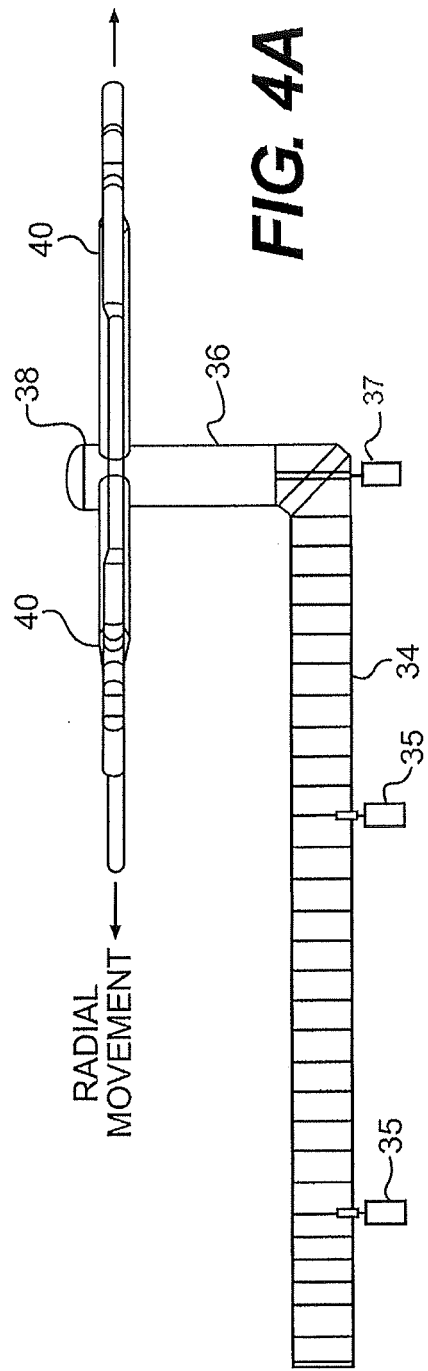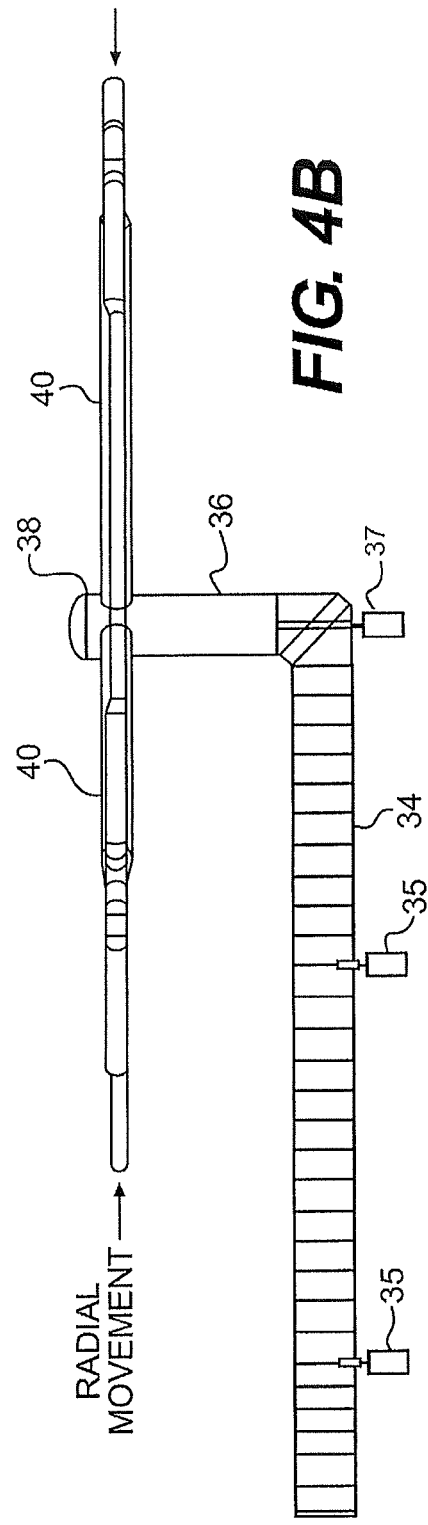

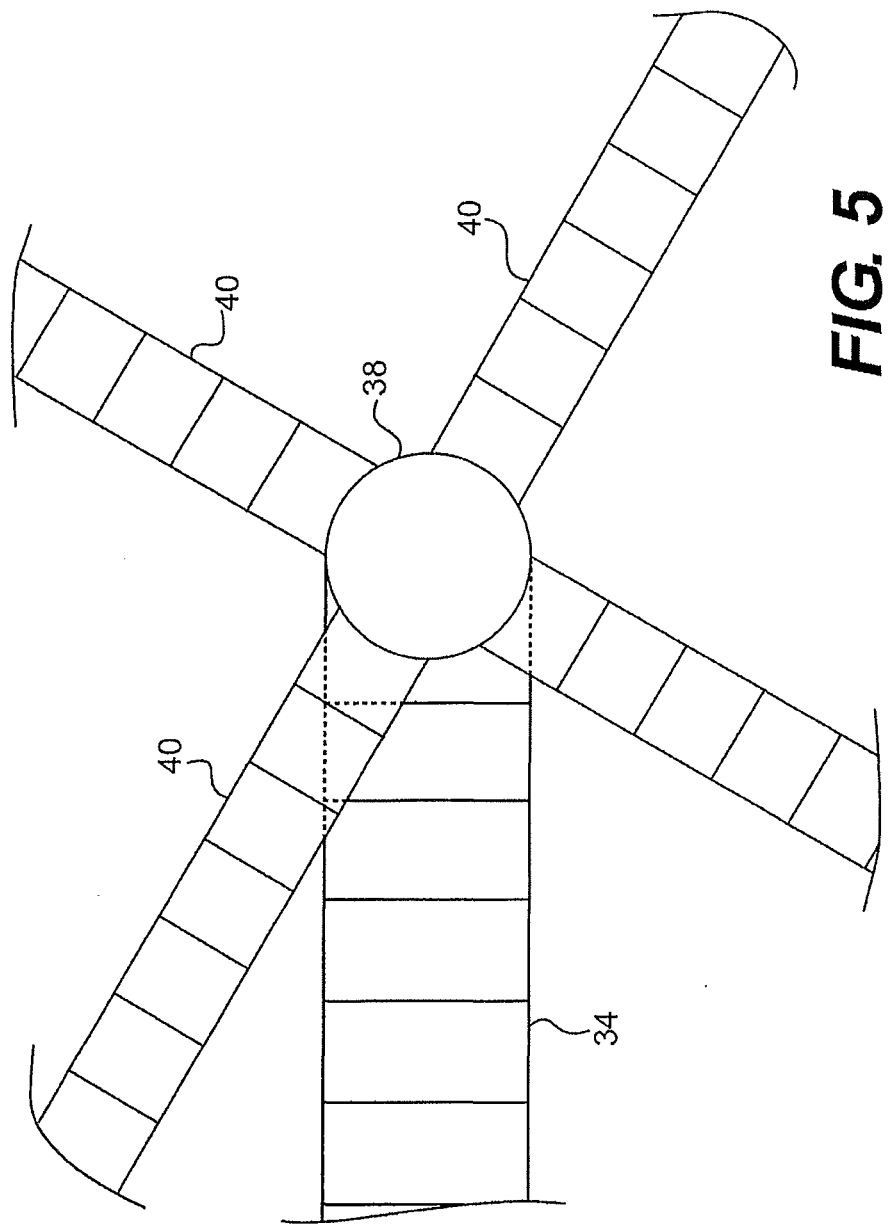

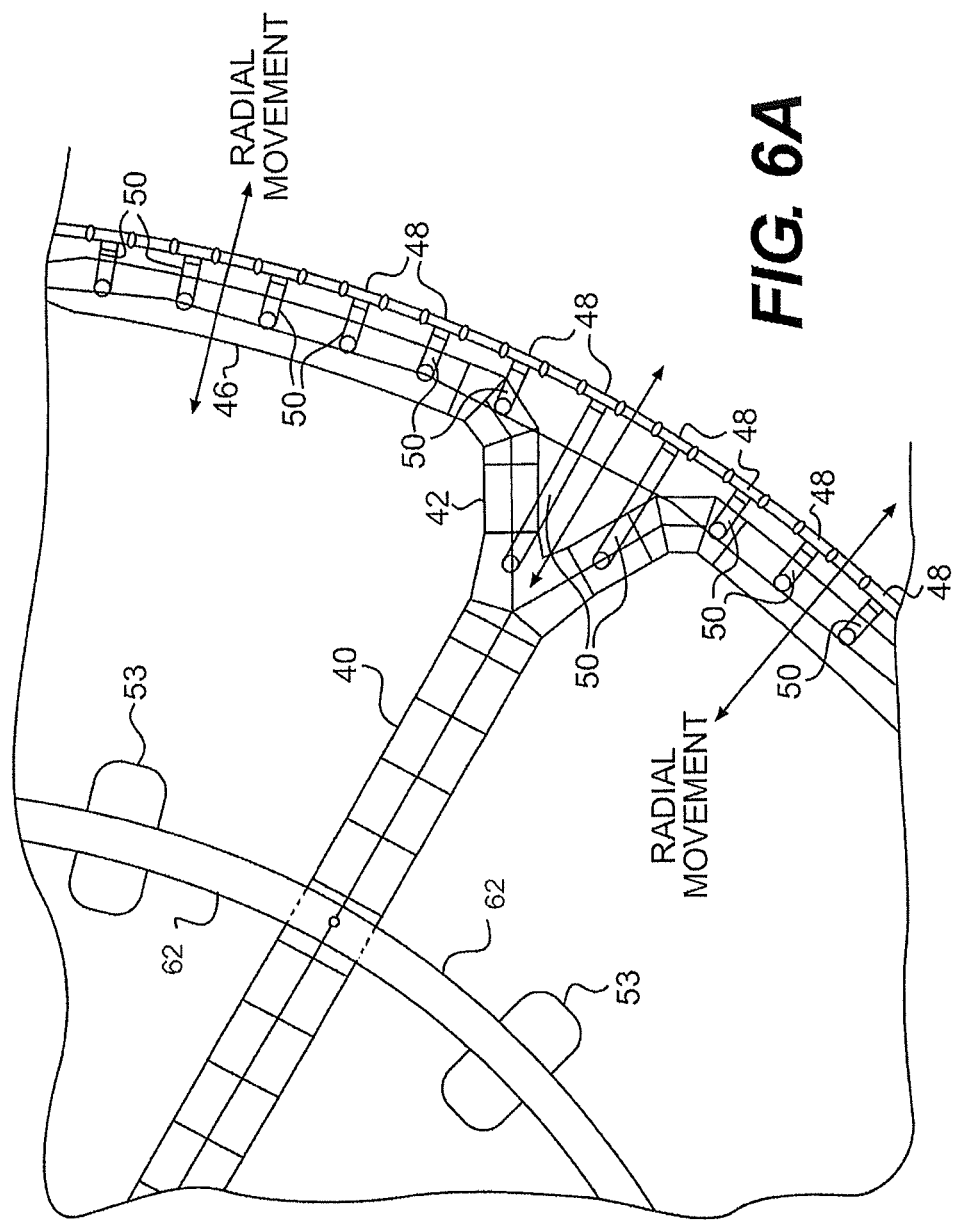

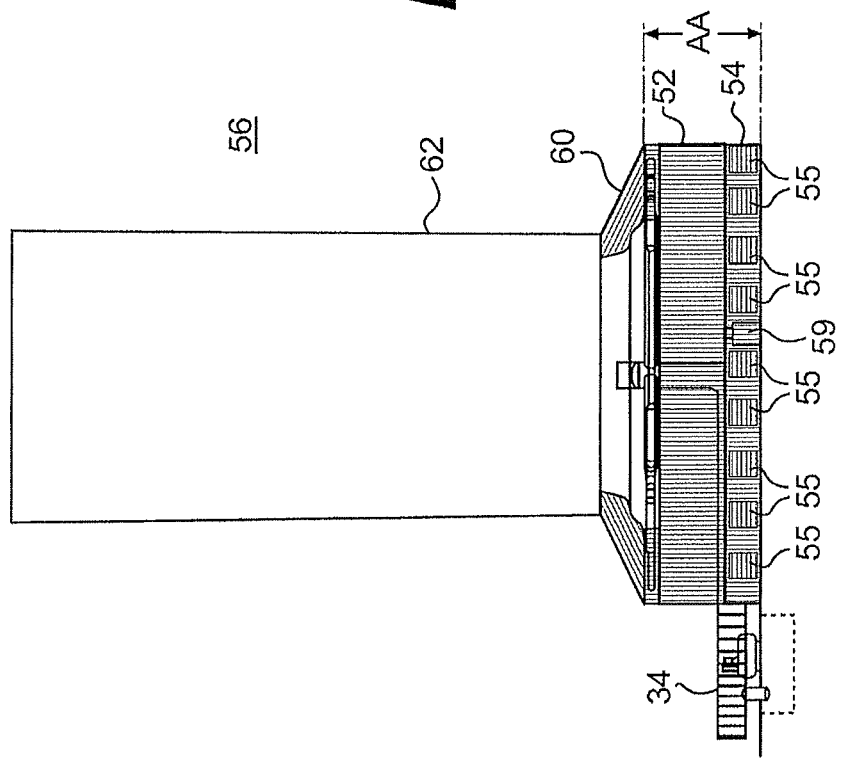

APPARATUS AND METHOD FOR AN AIR BYPASS SYSTEM FOR A NATURAL DRAFT COOLING TOWER

CROSS-REFERENCE TO RELATED APPLICATIONS

This application claims priority to and is a continuation of U.S. patent application entitled APPARATUS AND METHOD FOR AN AIR BYPASS SYSTEM FOR A NATURAL DRAFT COOLING TOWER, filed Mar. 22, 2010, having U.S. Pat. No. 8,876,090, the disclosure of which is hereby incorporated by reference in its entirety.

FIELD OF THE INVENTION

The present invention relates to an apparatus and method for an air bypass system for a natural draft cooling tower that employs a wet heat exchanger, a direct dry heat exchanger or an indirect dry heat exchanger to extract heat from a heated fluid, which is usually liquid or steam. The aforementioned cooling tower operates by natural draft which utilizes air buoyancy via a tall chimney. The extracted heat produces warm air from and naturally rises due to the density differential to the cooler outside ambient air.

BACKGROUND OF THE INVENTION

Cooling towers are heat exchangers of a type widely used to emanate low grade heat to the atmosphere and are typically utilized in electricity generation, air conditioning installations and the like. In a natural draft cooling tower for the aforementioned applications, airflow is induced via hollow chimney-like tower by the density difference between cool air entering the bottom of the tower and warm air leaving the top. This difference is due to heat transfer from the fluid being cooled, which is passed through the interior of the tower. Cooling towers may be wet or dry. Dry cooling towers can be either "Direct Dry," in which steam is directly condensed by air passing over a heat exchange medium containing the steam or an "Indirect Dry" type natural draft cooling towers, in which the steam first passes through a surface condenser cooled by a fluid and this warmed fluid is sent to a cooling tower heat exchanger where the fluid remains isolated from the air, similar to an automobile radiator. Dry cooling has the advantage of no evaporative water losses. Both types of dry cooling towers dissipate heat by conduction and convection and both types are presently in use. Wet cooling towers provide for direct air contact to a fluid being cooled. Wet cooling towers benefit from the latent heat of vaporization which provides for very efficient heat transfer but at the expense of evaporating a small percentage of the circulating fluid.

In addition to types of cooling tower designs described above, cooling towers can be further classified as either cross-flow or counter-flow. Typically in a cross-flow cooling tower, the air moves horizontally through the fill or packing as the liquid to be cooled moves downward. Conversely, in a counter-flow cooling tower air travels upward through the fill or packing, opposite to the downward motion of the liquid to be cooled.

In a direct dry cooling tower, the turbine steam exhaust is condensed directly in an air-cooled condenser. Approximately five to ten times the air required for mechanical draft evaporative towers is necessary for dry cooling towers. This type of cooling is usually used when little or no water supply is available. This type of system consumes very little water and emits no water vapor plume.

To accomplish the cooling required, the condenser requires a large surface area to dissipate the thermal energy in the gas or steam and presents several problems to the design engineer. It is difficult to efficiently and effectively direct the steam to all the inner surface areas of the condenser because of non-uniformity in the delivery of the steam due to system ducting pressure losses and velocity distribution. Therefore, uniform steam distribution is desirable in air cooled condensers and is critical for optimum performance. Therefore it would be desirous to have a condenser with a strategic layout of ducting and condenser surfaces that would ensure an even distribution of steam throughout the condenser, while permitting a maximum of cooling airflow throughout and across the condenser surfaces.

Another problem with the current air cooled condensers is the expansion and contraction of the ducts and cooling surfaces caused by the temperature differentials. Pipe expansion joints may be employed at critical areas to compensate for the thermal movement. A typical type of expansion joint for pipe systems is a bellow which can be manufactured from metal (most commonly stainless steel). A bellow is made up of a series of one or more convolutions, with the shape of the convolution designed to withstand the internal pressures of the pipe, but flexible enough to accept the axial, lateral, and/or angular deflections. In all but the smallest of applications, branching of the steam ducting is required to distribute the steam to the various coil sections of the condenser. The very nature of branching breaks the steam flow into different directions which necessarily introduces thermal expansion in different directions. These expansion accommodating devices are expensive. Therefore it would be additionally desirous to have a condenser arrangement in which the thermal expansion and contraction is simply and inexpensively managed.

The natural draft cooling tower typically has a hollow, open-topped shell of reinforced concrete with an upright axis of symmetry and circular cross-section. The thin walled shell structure usually comprises a necked, hyperbolic shape when seen in meridian cross-section or the shell may have a cylindrical or conical shape. Openings at the base of the tower structure enable ingress of ambient air to facilitate heat exchange from the fluid to the air. Forced draft cooling towers are also known, in which the airflow is produced by fans. These devices usually do not incorporate a natural draft shell because the fans replace the chimney effect of the natural draft cooling towers. However, forced draft fans may be incorporated in a natural draft design to supplement airflow where the density difference described above is not sufficient to produce the desired airflow.

It is known that improving cooling tower performance (i.e. the ability to extract an increased quantity of waste heat in a given surface) can lead to improved overall efficiency of a steam plant's conversion of heat to electric power and/or to increases in power output in particular conditions. Cost-effective methods of improvement are desired. The present invention addresses this desire. Equivalent considerations can apply in other industries where large natural draft cooling towers are used.

Additionally, large natural draft cooling towers are high-capital-cost, long-life fixed installations, and it is desirable that improvements be obtainable without major modifications, particularly to the main tower structure. The method and apparatus of the present invention are applicable to the improvement of existing natural draft cooling towers, as well as to new cooling towers.

In cooler weather the return temperature of a fluid from the cooling tower and/or freezing a fluid in the heat exchanger is a major concern. When the airflow has the capacity to exchange more heat than desired the airflow must be reduced. Airflow dampers are known to be used is series with heat exchangers. The dampers may be throttled to restrict the airflow. However, even in the wide open position a pressure loss through the damper occurs. This pressure loss reduces the total airflow and thus the cooling capacity of the tower.

Additionally, due to temperature and humidity extremes, a natural draft cooling tower may extract too much heat energy out of the heated liquid or have the liquid to be cooled freeze up. For example, a dry cooling tower may extract too much thermal energy away from the heated liquid condensate, which would require extra heating energy from a boiler or heat source to reheat the liquid back to its optimal temperature, thus lowering the system's efficiency. A wet tower on the other hand is susceptible to ice formation in cold weather. In particular ice may form and build up in the fill and cause structural damage to the fill and/or the supporting structure.

Therefore it would desirous to have an economical, efficient natural draft cooling tower in which the cooling airflow could also be controlled. It would be also desirous to have a way to mix ambient air with the cooling air to better regulate the entire cooling system.

SUMMARY OF THE INVENTION

Embodiments of the present invention advantageously provides for an air bypass system and method for a cooling tower, which can be applied to dry or wet cooling towers. An embodiment of the invention includes a natural draft cooling tower that cools an industrial fluid, comprising a tower having a perimeter that extends vertically about a vertical axis through which an airstream flows and a heat exchanger disposed proximate said tower, wherein, the industrial fluid and airstream flow there through. It further includes a chimney section and a base section, wherein said base section comprises a first airflow inlet at a first vertical position along the vertical axis and a second airflow inlet located at second vertical position along the vertical axis.

Another embodiment is for a natural draft cooling tower that cools an industrial fluid, comprising a tower having a perimeter that extends vertically about a vertical axis and a first airflow inlet at a first vertical position along the vertical axis providing a first airflow. It further includes a heat exchanger positioned adjacent to said first airflow inlet such that the first airflow enters and passes through said heat exchanger prior to entering said first air inlet and a second airflow inlet located at second vertical position along the vertical axis providing a second airflow to be mixed with said first airflow.

Another embodiment of the present invention is for a method for cooling an industrial fluid using a natural draft cooling tower, the method comprising flowing the industrial fluid to be cooled through a heat exchanger and flowing a first airflow through a first inlet at a first vertical position and over said heat exchanger to induce heat exchange and flowing a second airflow through a second airflow inlet located at a second vertical position. The method further includes mixing said first airflow and said second airflow as said first airflow exits said heat exchanger.

An additional embodiment of the present invention is for a method for cooling an industrial fluid using a natural draft cooling tower, the method comprising flowing the industrial fluid to be cooled through a heat exchanger, wherein the heat exchanger is positioned adjacent a first airflow inlet at a first vertical position to induce heat exchange and flowing a second airflow through a second airflow inlet located at a second vertical position. The method further includes mixing said first airflow and said second airflow as said first airflow exits said heat exchanger.

Another embodiment is for the system, having the means for cooling an industrial fluid using a natural draft cooling tower and the means for flowing the industrial fluid to be cooled through a heat exchanger. The system also has the means for flowing a first airflow through a first inlet located at a first vertical position means for flowing said first airflow through said heat exchanger to induce heat exchange on the industrial fluid via said airflow and the means for flowing a second airflow through a second inlet and further means for mixing said first airflow and a second airflow inside a cooling tower structure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

FIGS. 4A and 4B are a side view of an embodiment illustrating the ducting orientation of an embodiment of the present invention and an exaggerated depiction of the radial movement of the present system.

FIG. 5 illustrates the radial ducting arm manifold in accordance with an embodiment of the present invention.

FIG. 6A illustrates the bifurcated ducting and a portion of the cooling annular ring section in accordance with an embodiment of the present invention and also illustrates the radial movement of the system.

FIG. 7 illustrates the cooling structure comprising a base stratum section, a cooling annular ring section, an angular roof section and a chimney section in accordance with an embodiment of the present invention.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Figure 1:
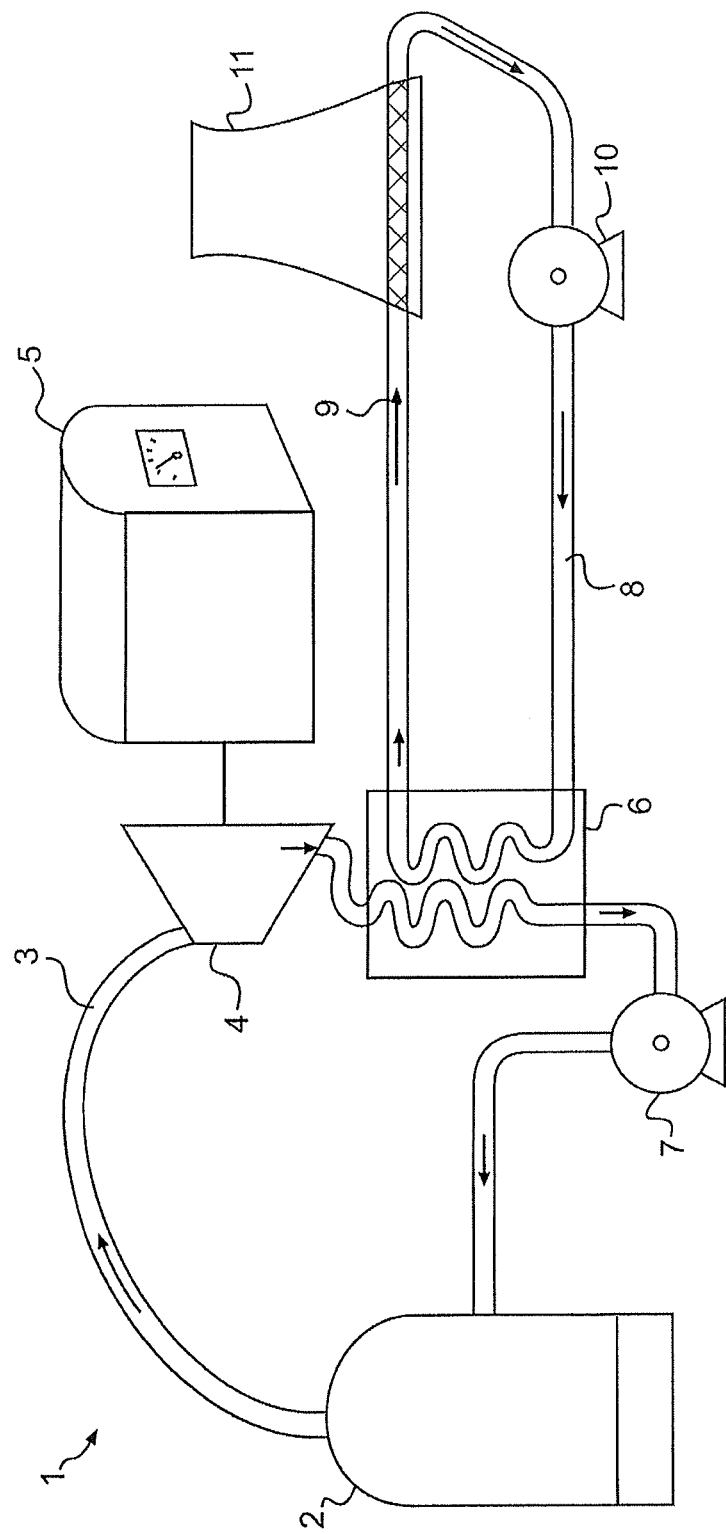
FIG. 1 is a schematic steam/water circuit diagram of a simplified electric power generating installation in which an embodiment of the present invention that may be used.

FIG. 1 is a schematic diagram of the steam/water circuit 1 of a greatly-simplified electric power generating installation. A boiler 2 produces steam which travels via a duct 3 to a steam turbine 4 which drives a generator 5. The boiler 2 may fired with fossil fuel such as coal or natural gas to provide heat or the heat source may be a nuclear reactor (not shown). Wet steam exiting the steam turbine 4 is condensed in a heat exchanger 6 and exits as water, which is recirculated as feed water to the boiler 2 via a feed water pump 7.

A separate cooling water supply is provided to heat exchanger 6 via a duct 8 and exits at an elevated temperature via a duct 9, being pumped by cooling water pumps 10. In some installations, a large supply of water is available from a lake, river or artificial cooling pond for use as cooling water. However, in cases where supply is not available, cooling water may be directly recirculated as shown in FIG. 1, passing through a cooling tower 11 to lower its temperature before returning to the heat exchanger 6 via duct 8. This arrangement avoids the need for a large natural supply of cooling water. It is to be understood that circuit 1 is for illustrative purposes only. In a practical power generating facility, (not shown) there may be additional components, such as economisers, superheaters, and (usually) multiple boilers and turbines and ducting to accommodate them.

Wet or evaporative cooling towers are heat exchangers of the type in which a liquid as shown in FIG. 1 is cooling water is passed into a space through which a gas atmospheric air is flowing and in that space is cooled by direct contact with the cooler air and by partial evaporation. To give sufficiently long liquid residence times and gas/liquid interface areas. The liquid is often sprayed into the space, falling downward or being splashed onto a large-surface-area fixed structure (known for example as "packing") at the base of the tower, finally collecting in a basin below the packing. In small cooling towers of the sizes used in air conditioning and similar applications, the flow of gas is normally produced by fans, typically integral with the cooling tower itself. However, in the largest cooling towers, typical of electric power generation applications, natural draft is often relied on to provide the airflow.

Figure 2:
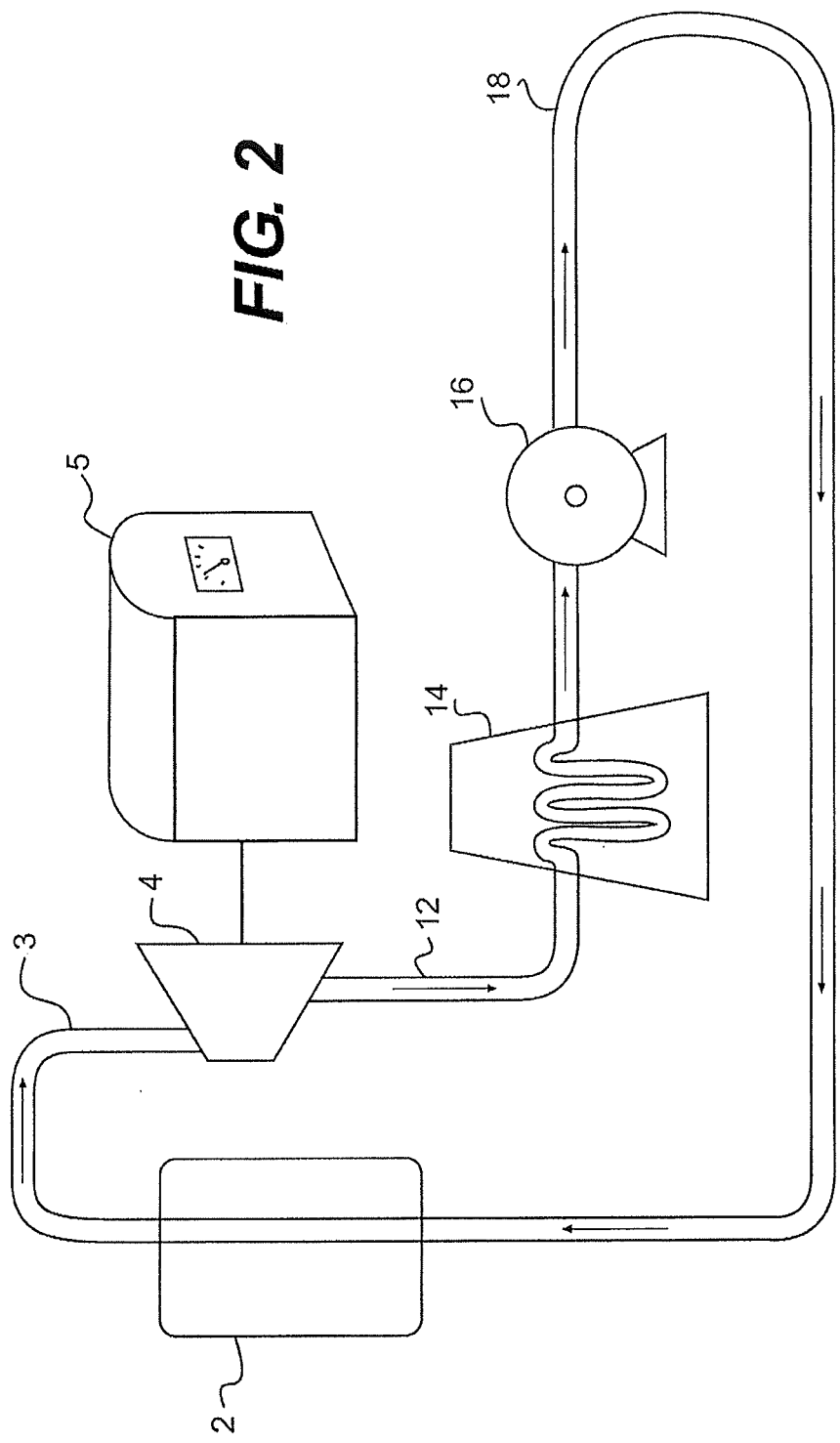
FIG. 2 illustrates a simple schematic illustration of an embodiment of the invention in which the output of a steam turbine is directly coupled to the condenser tower.

FIG. 2 illustrates a simple schematic of an embodiment of the present invention wherein output of a steam turbine is directly coupled to an air cooled condenser. The boiler 2 heats a fluid, for example water until it becomes a gas (steam). The steam leaves the boiler 2 via a steam duct 3 and enters the steam turbine 4, which is a mechanical device that extracts thermal energy from pressurized steam, and converts it into rotary motion. This rotary motion, for example, may turn a generator 5 to produce electricity. In this example, the steam turbine is a condensing turbine. This type of steam turbine exhausts steam in a partially condensed state, typically of a quality near 90%, at a pressure well below atmospheric to an air cooled condenser tower 14 via duct 12. The air cooled condenser tower 14 further extracts thermal energy away from the steam producing a liquid with a temperature just below boiling which is collected and pumped back to the boiler 2 via pump 16 through water return duct 18.

Now, with reference to FIGS. 3-6 showing a generator 30 is operated by steam turbine 32. The steam may be generated in any of a numerous ways, for example, a coal fired boiler or a nuclear reactor. As the waste steam egresses the turbine 32, it enters a first end of horizontal duct 34. The other end of the horizontal duct 34 is affixed to a central riser duct 36 which is located in the middle of the tower and terminates into a radial manifold 38. Four radial ducts 40 emanate from the radial manifold 38. Each radial duct is connected to a terminal duct as shown as a Y-duct 42 in FIG. 6A. The other sides of the Y-duct 42 are connected to the peripheral manifold 46, which is continuous about the perimeter of the tower. The peripheral manifold 46 is connected to the finned tube bundles 48 via a bundle duct 50. The system of bundles produces a circular pattern, producing the annular ring 52. It should be noted that depending on the performance needs and the size of the cooling system, the radial ducts can be any number. For example, there may be six or eight radial ducts emanating from the central riser duct 36 to the peripheral manifold in additional embodiments. FIG. 6B illustrates an alternative embodiment for connecting the radial duct 40 to the peripheral manifold 46 which employs an eased tee duct 43.

Figure 3:
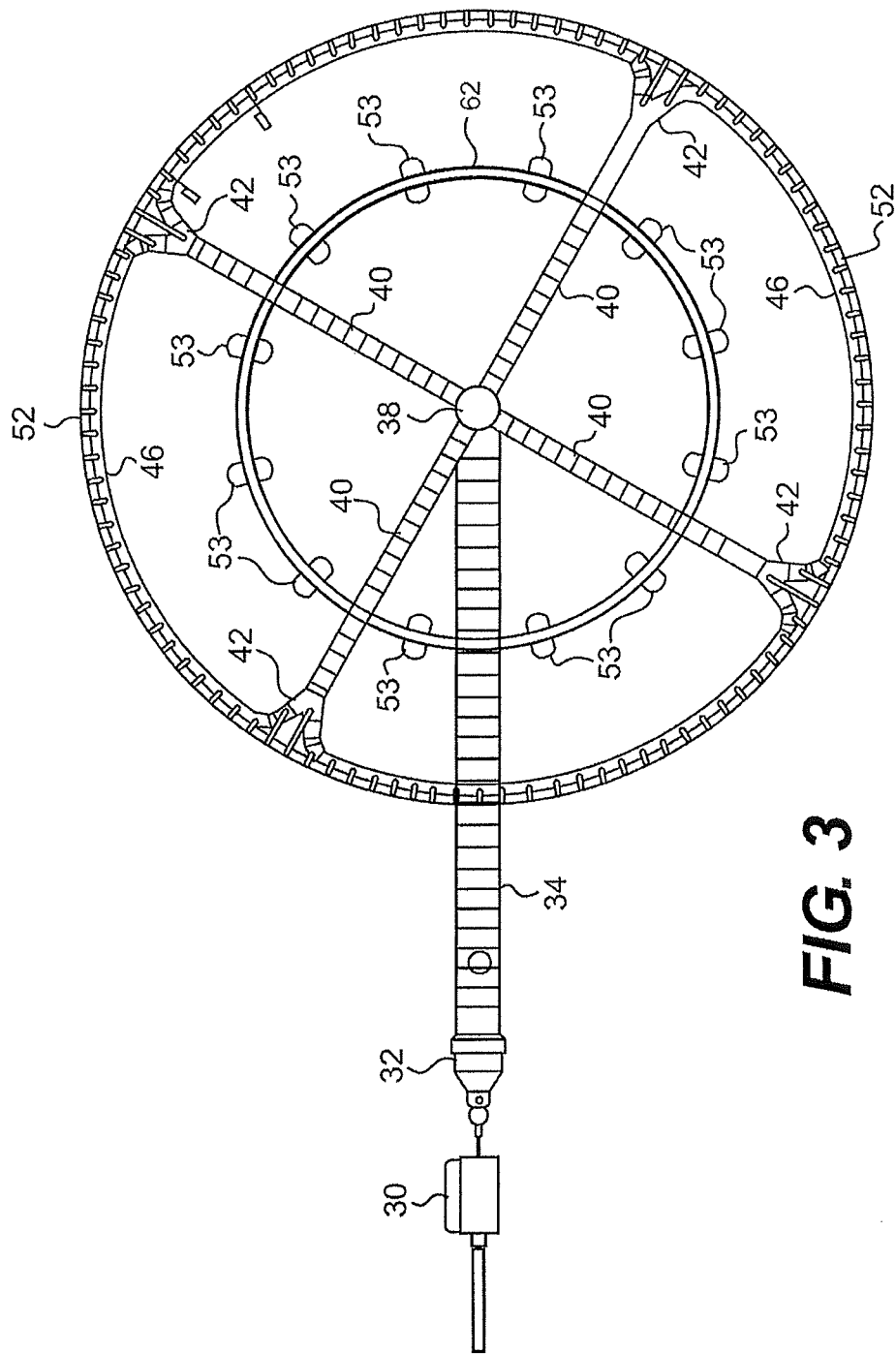
FIG. 3 is a plan view of an embodiment the present invention illustrating a steam duct connecting radial ducting arms and bundles.
Figure 6B:
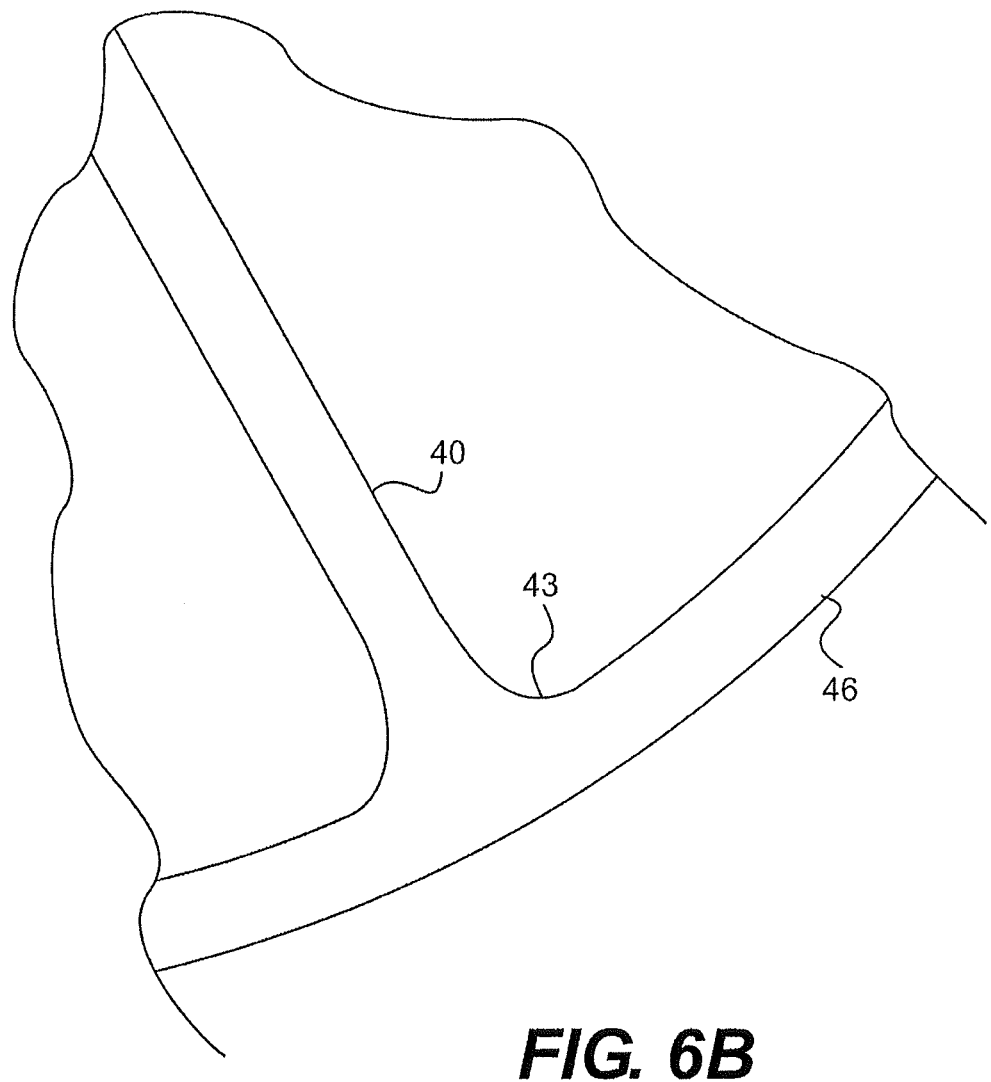
FIG. 6B illustrates an alternative arrangement for connecting the radial arm to the cooling annular ring section.

FIG. 3 illustrates a series of columns 53 supporting shell 62. In this embodiment, the ducting system hangs from the bottom of the shell and is not supported from underneath. FIG. 6A is a close in view of FIG. 3. The radial arm ducts 40 are hanging from the bottom of tower shell 62. Turning to FIGS. 4A and 4B, they depict duct supports 35 to support the horizontal duct 34. The ducting is rigidly fixed to the support in the center of the tower and is designated 37. These figures also depict any exaggerated radial movement of the present system. In a preferred embodiment, the coil tubes, ducting, and piping material are all carbon steel, thus providing an economic alternative to the more expensive material.

As with any physical body in which goes through temperature variations, it will expand or contract in accordance with its temperature. An advantage of using the peripheral manifold in a big loop with a fixed point center riser arrangement is that its thermal dilatation is purely radial and there is no need of bellows. Maximum radial expansion is approximately 1 inch. This movement is introduced at the top of the coil which is purposely not constrained at the top from radial movement as the top of the bundles are only connected to the steam box and the peripheral duct. Because the coils are so tall, the radial movement will induce only a slight inclination of the coils. Not only does this save cost in construction by not having to employ bellows, but the bellows will not become a point of failure for the system, nor will they need to be replaced at a regular maintenance interval. An additional advantage of the above arrangement is that it allows an engineer to design an easy and inexpensive cleaning system that can be hung on a rail located on the perimeter of the cooling annular ring and above the bundles owing to the fact the tube bundles are arranged in a circumferentially oriented outward face as opposed to a pleated or zigzag arrangement.

Turning to FIG. 7, a cooling structure 56 comprises a base section 54 with its annular ring section 52, an angular roof section 60 and a chimney section 62. The base section's 54 annular ring section 52 is made up from a plurality of finned tube bundles 48 placed in a circular arrangement continuous about the perimeter as shown in FIG. 3. The angular roof section 60 is essentially a warm air director between the finned tube bundles 48 and chimney section 62 and may be steel cladding or any other cooling structure building material.

As can be seen, the bottom of the base stratum section 54 is at ground level and has air inlet with an airflow regulator installed. In this example, the airflow regulator is shown as louvers 55, which translate between an open and closed position to control airflow through the cooling structure 56. The louvers discussed throughout the present application can be replaced with any air flow regulation device. For example, the louvers can be replaced with roll up doors, hinged doors, sliding doors or any variable structure to limit airflow through an opening. An optional access door 59 is also shown. The chimney section depicted is cylindrical; however, it can be any shape that allows for air efficient traversal through the chimney section. For example, the chimney section can be in the shape of a hyperboloid, which is the shape most people associate with nuclear power generation stations.

Figure 8:
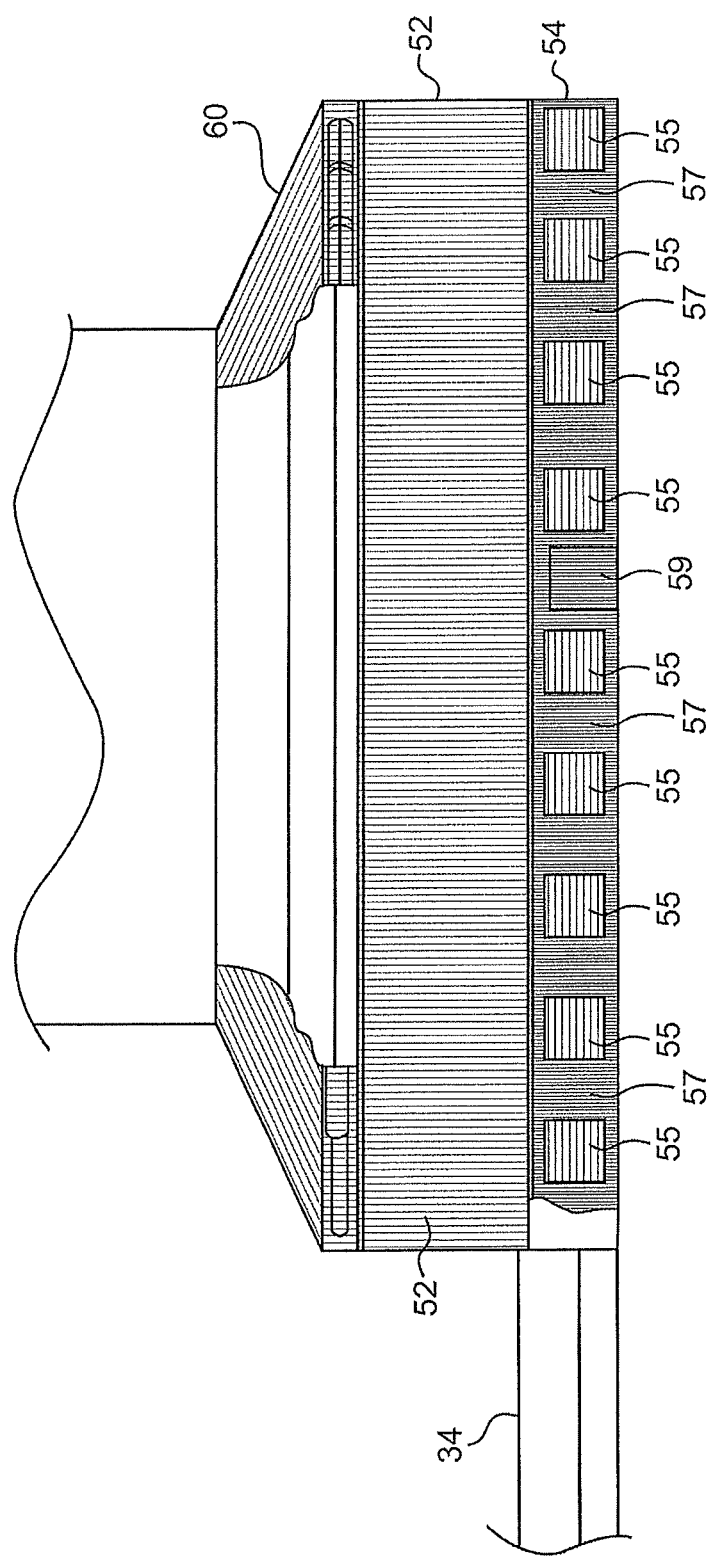
FIG. 8 is a side view orientation of the stratum section and the cooling annular ring of the present invention.
Figure 9:
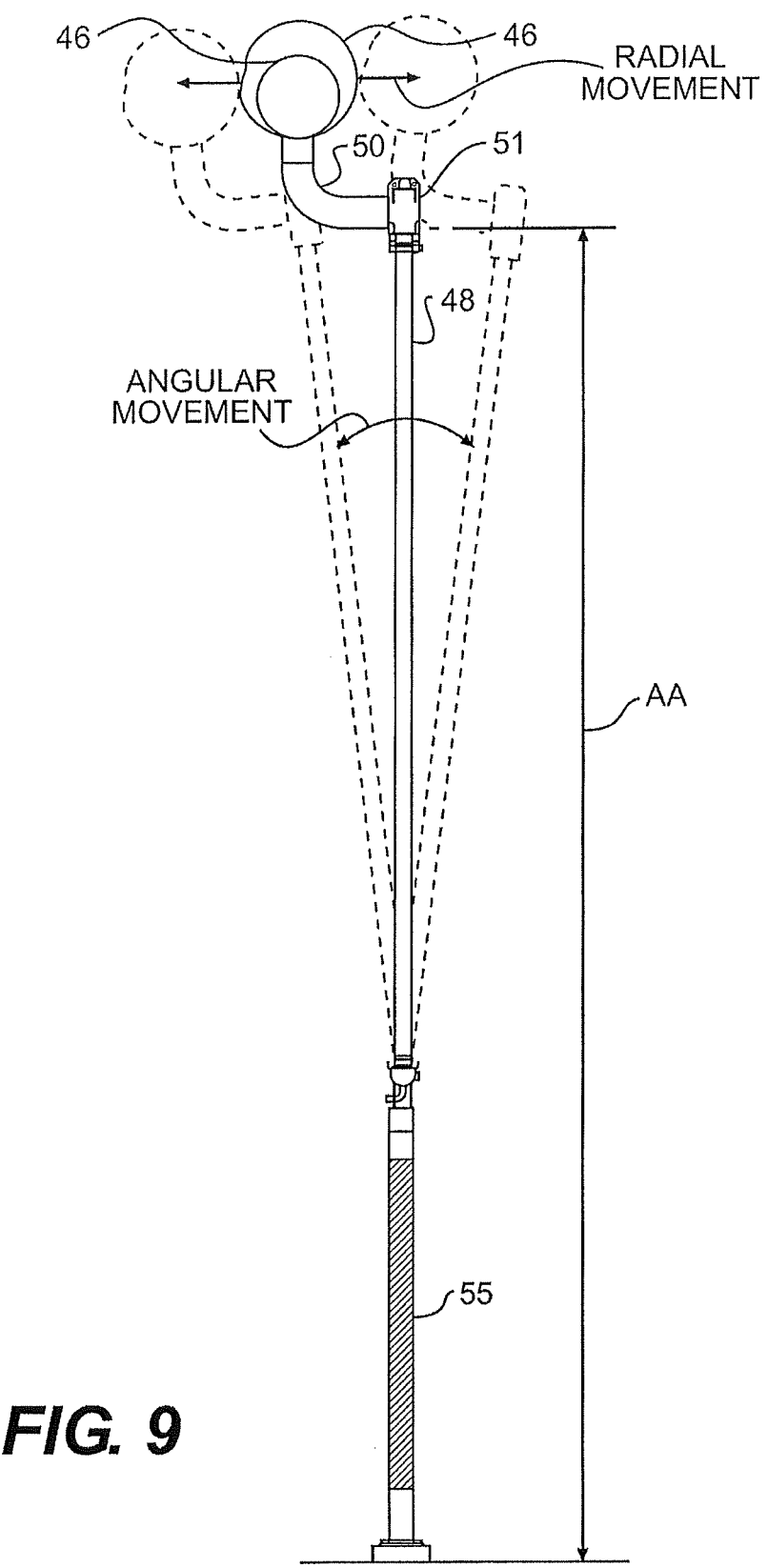
FIG. 9 illustrates a single set of the tube bundles attachment to the peripheral manifold to a steam box located in accordance with an embodiment of the present invention and also illustrates the radial and angular movements of the system grossly exaggerated.

FIG. 8 is an additional side view of the present invention which better illustrates the base stratum section 54 and the annular ring section 52. FIG. 9 is a side view of a slice of the finned tube bundles 48. The finned tube bundles 48 are attached to the peripheral manifold 46 via the bundle duct 50. A steam box 51 may be located on top of the finned tube bundle 48 to facilitate movement of the steam. A steam box in this particular embodiment, may distribute the exhaust steam across the top of the set of finned tube bundles 48 to aid in the condensing of the steam. To better appreciate the dimension of the present embodiment, a measurement AA, represents height of the finned tube bundle's 48 and is also illustrated on FIG. 7. FIG. 9 also depicts the radial and angular movement of the present system grossly exaggerated for illustrative clarity.

Figure 10:
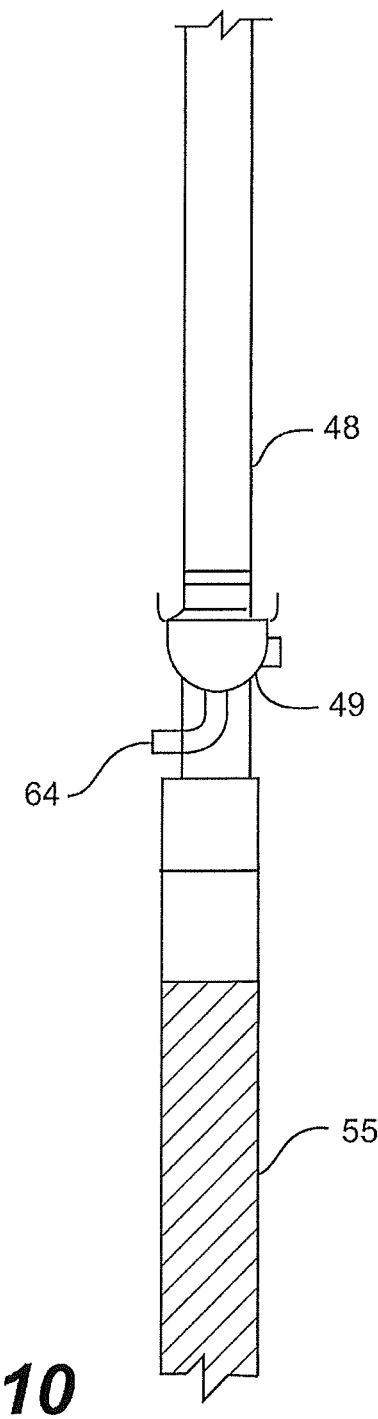
FIG. 10 illustrates the lower section of the tube bundle and the collector in accordance with an embodiment of the present invention.

As the steam traverses through the finned tube bundles 48, it cools and reverts back into its liquid form. The liquid reaches the bottom of the finned tube bundle 48 into to a collector 49 and the liquid leaves via water return 64, as shown in FIG. 10. Also shown in FIG. 9 is a slice of the base stratum section 54 depicting where the louvers 55 could be positioned in one embodiment of the present invention.

As illustrated in FIG. 8, the louvers 55 are positioned below the finned tube bundles 48 to provide a second air path and enable air to by-pass the bundles in order to control the cooling capacity of the system. The louvers 55 are installed vertically and create "windows" in the vertical sealing cladding 57 located below the bundles. When the louvers are closed, the cooling capacity of the tower is maximized and all the cooling air is flowing through the bundles and the draft is at its maximum. When the louvers are in the open position, the capacity of the dry cooling tower is reduced due to two effects. The first effect is due to the reduction of cooling air flowing through the finned tube bundles. The second is due to the reduction of the total airflow related to the reduction of draft (chimney effect) in the tower section due to the lower temperature inside the tower created by the mixing of hot air generated by the heat of the air going through the bundles along with the cold air passing through the louvers. This is turn allows the user to control the rate and the capacity of the dry cooling tower, therefore the user can control the steam turbine back pressure.

The present embodiment has many advantages. For example, the louvers provide an inexpensive control system. The louvers are less costly than isolating valves which have to be installed on the steam ducting to neutralize the exchange surface by segments or partitions. The present invention needs a relatively low amount of louvers, approximately 50% of the face area of the bundles need to be covered with louvers to be effective. Additionally, the actuators of the louvers are located on ground level enabling an easy maintenance. However, the air bypass could be located above the tube bundles and have similar air flow regulating characteristics.

Figure 11A:
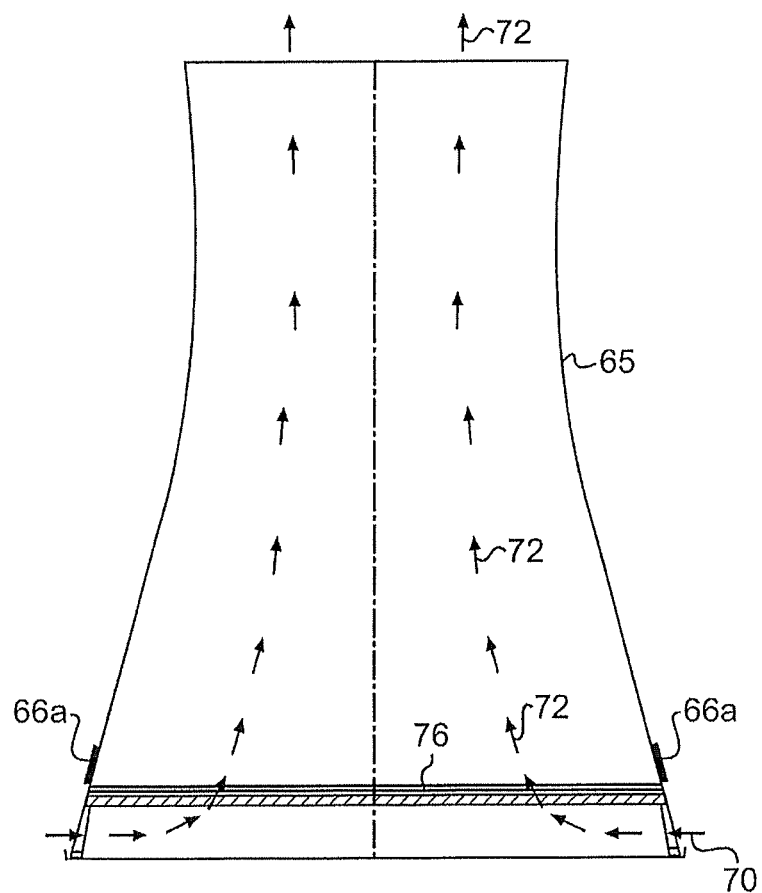
FIG. 11A illustrates a cooling tower in which an air inlet bypass is closed and air through the heat exchanger is maximized in accordance with an embodiment of the present invention.
Figure 12A:
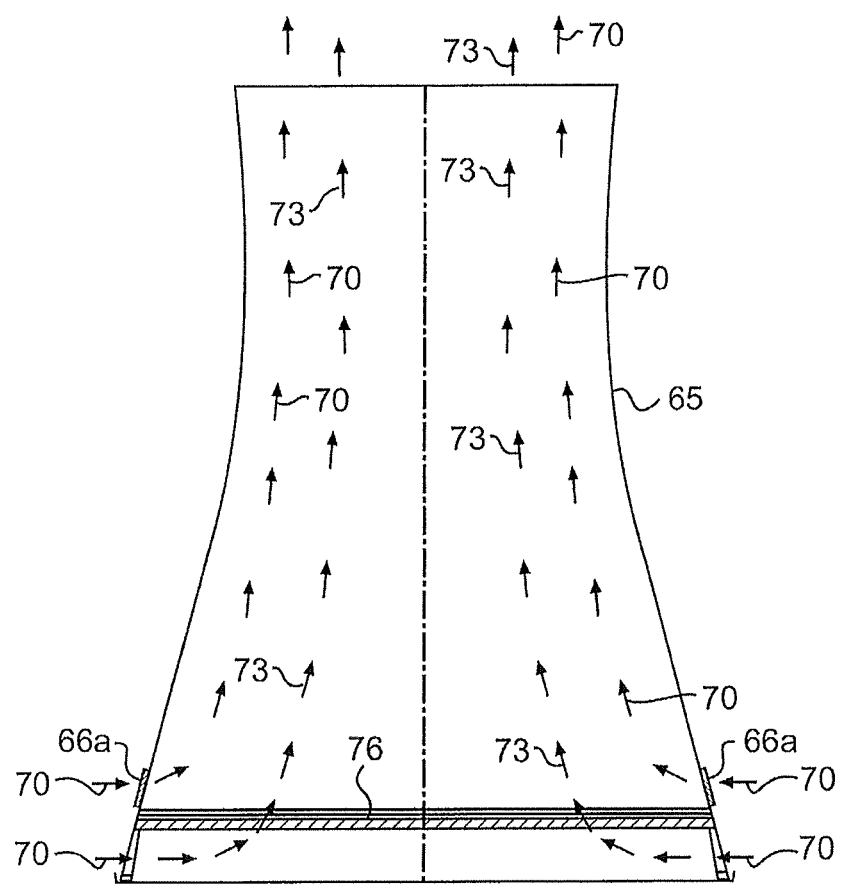
FIG. 12A illustrates a cooling tower in which an air inlet is open and air through the heat exchanger is reduced in accordance with an embodiment of the present invention.

Turning now to FIGS. 11A and 12A, each illustrates louvers functionality in an alternative embodiment for a counter flow natural draft cooling tower. For example, FIG. 11A illustrates an airflow inlet with a set of air bypass louvers 66a in a closed position and the airflow through the heat exchanger 76 is then maximized. The heat exchanger 76 is often made up of evaporative cooling fill in a wet tower configuration. The ambient air 70 enters at the base of the tower 65 through the airflow inlet with and all the of the ambient air 70 passes through the heat exchanger 76. The heat exchange 76 can be any type of heated fluid distribution system in which thermal energy is removed from the heated liquid. The heated air 72 rises due to convection. Convection above a hot surface occurs because hot air expands, becomes less dense, and rises as described in the Ideal Gas Law.

Figure 11B:
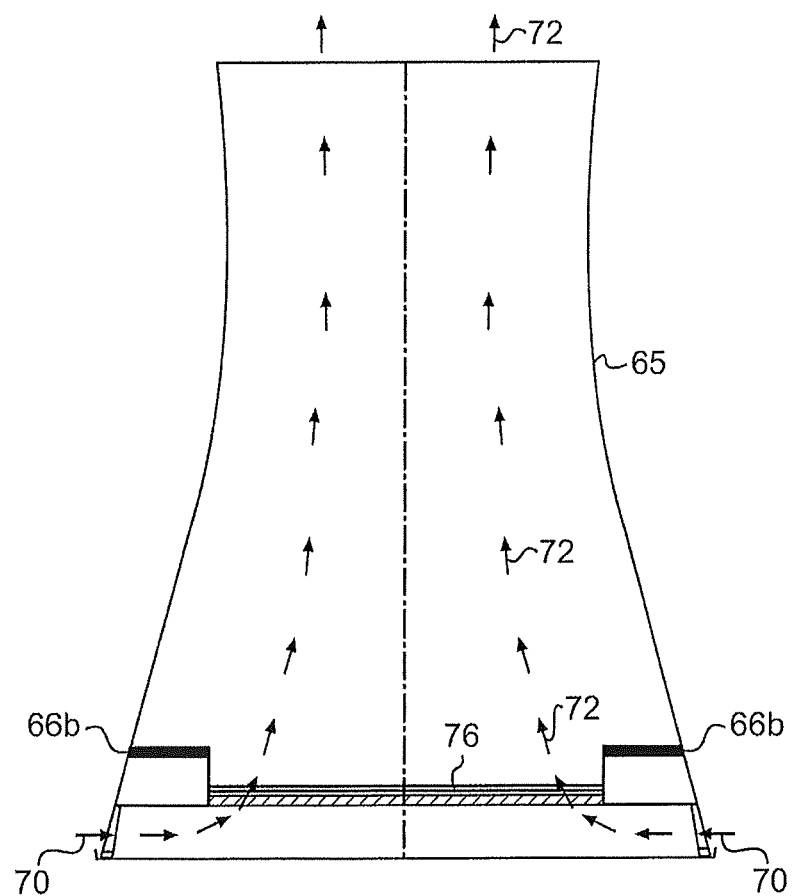
FIG. 11B illustrates a cooling tower in which an air inlet bypass located inside a structure is closed and air through the heat exchanger is maximized in accordance with an embodiment of the present invention.
Figure 12B:
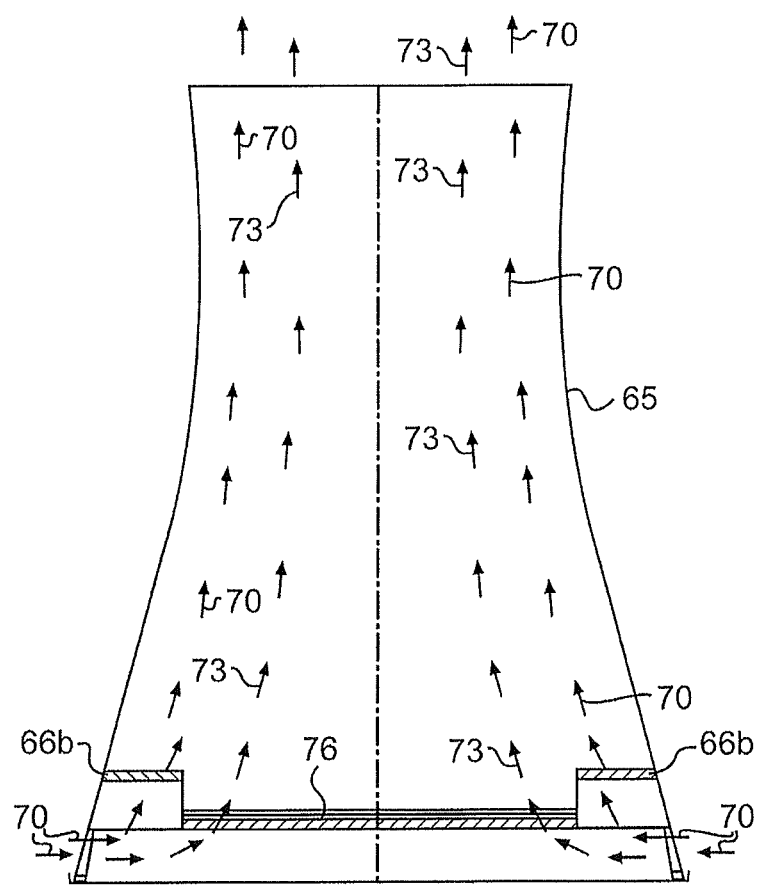
FIG. 12B illustrates a cooling tower in which an air inlet bypass located inside a structure is open and air through the heat exchanger is reduced in accordance with an embodiment of the present invention.

Turning now to FIGS. 11B and 12B, in an alternative embodiment, the airflow inlet's set of air bypass louvers 66a (FIG. 11A) can be replaced with an internal airflow bypass louvers 66b, which is located inside the tower 65. This design is less likely to be affected by adverse weather, for example, sleet or freezing rain. The first airflow inlet's bypass louvers 66a and the internal airflow bypass louvers 66b are generally louvers which translate between an open and closed position. The louvers for all embodiments can be mounted immediately inside the cooling tower support structure, flush to cooling tower heat exchanger or immediately outside the cooling tower heat exchanger. In additional embodiments, the lovers can be exchanged for door type inlet control.

In FIGS. 12A and 12B, the airflow inlet's set of air bypass louvers 66a or 66b is open and air through the heat exchanger 76 is reduced. Ambient air 70 enters at the base of the tower 65 and the ambient air 70 is passed through the heat exchanger 76 and becomes heated air 73. Additionally, ambient air 70 enters the tower 65 above the heat exchanger 76 and mixes somewhat with the heated air 73 and exits out the top of the tower 65 and thus, the amount of air flowing through the tower is reduced.

In FIG. 12, the first air bypass louvers 66a (or 66b) are open and air through the heat exchanger 76 is reduced. Ambient air 70 enters at the base of the tower 65 and the ambient air 70 is passed through the heat exchanger 76 and becomes heated air 73. Additionally, ambient air 70 enters the tower 65 above the heat exchanger 76 and mixes somewhat with the heated air 73 and exits out the top of the tower 65 and thus, the amount of air flowing through the tower is reduced.

Figure 13:
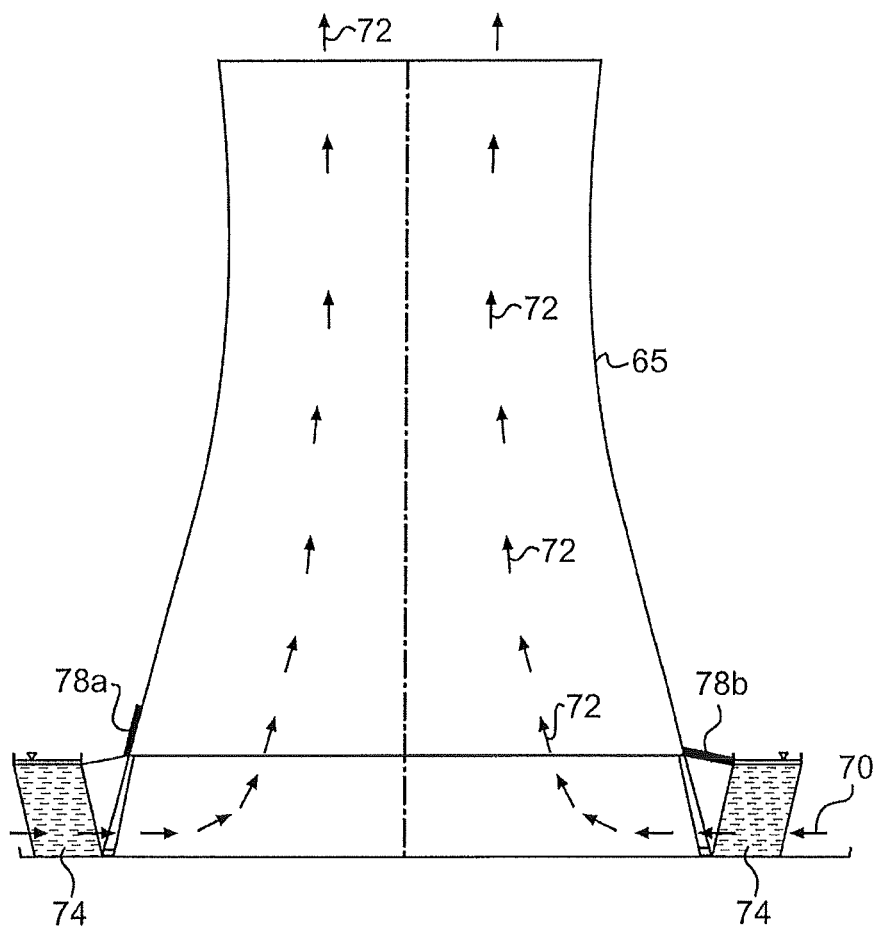
FIG. 13 illustrates a cooling tower in which the air bypass is closed and air through the heat exchanger is maximized, wherein the heat exchanger is located outside the tower shell structure, in accordance with an embodiment of the present invention.
Figure 14:
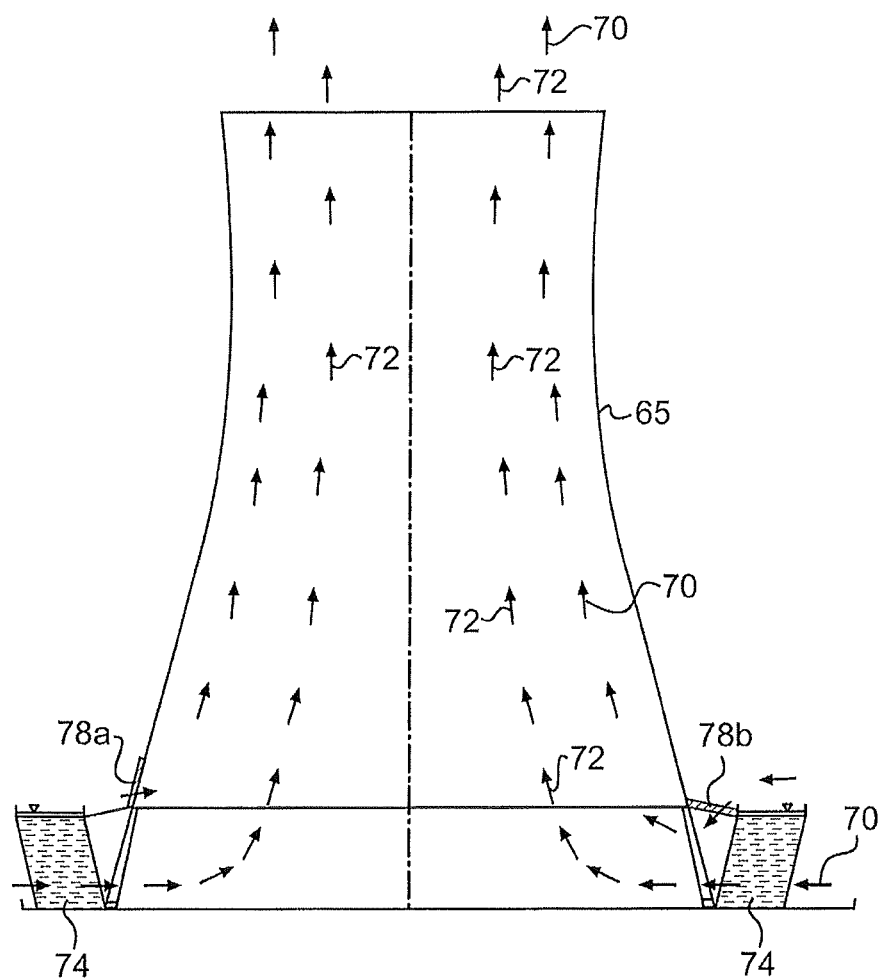
FIG. 14 illustrates a cooling tower in which the air bypass is open and air through the heat exchanger is reduced, wherein the heat exchanger is located outside the tower, in accordance with an embodiment of the present invention.

Now turning now to FIGS. 13 and 14, each illustrates louvers functionality in an alternative embodiment for a natural draft cooling tower, wherein heat exchanger 74, located outside of the tower, may be used. For example, FIG. 13 illustrates the first air bypass louvers 78a is closed and air through the heat exchanger 74 is maximized. The ambient air 70 passes through the heat exchanger 74 into the tower. The heated air 72 rises and leaves out the top of the tower 65. In an alternative embodiment, the first air bypass louvers 78a can be replaced for a second air bypass louvers 78b, which is located between the tower 65 and the heat exchanger 74.

In FIG. 14, the first air bypass 78a is open and air through the heat exchanger 74 is reduced. Ambient air 70 enters at the base of the tower 65 and the ambient air 70 is passed through the heat exchanger 74 and becomes heated air 72. Additionally, with the second air bypass louvers 78b, ambient air 70 enters the tower 65 beyond the heat exchanger 74 and mixes with the heated air 72 and exits out the top of the tower 65 and thus the amount of air flowing through the tower is reduced.

The louvers as described in the aforementioned description and figures may be replaced by other means to regulate air flow such as but not limited to roll up doors, hinged doors, sliding doors, or butterfly valves.

The processes and devices in the above description and drawings illustrate examples of only some of the methods and devices that could be used and produced to achieve the objects, features, and advantages of embodiments described herein and embodiments of the present invention can be applied to indirect dry, direct dry and wet type heat exchangers. Thus, they are not to be seen as limited by the foregoing description of the embodiments, but only limited by the appended claims. Any claim or feature may be combined with any other claim or feature within the scope of the invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A natural draft cooling tower that cools an industrial fluid, comprising:
    a tower having a perimeter that extends vertically about a vertical axis;
    a first airflow inlet at a first vertical position along the vertical axis providing a first airflow path for a first airflow;
    a heat exchanger comprising of a plurality of tube bundles having a top and a bottom arranged in a circular arrangement about the perimeter of the tower positioned adjacent to said first airflow inlet such that the first airflow enters and passes through said heat exchanger prior to entering said first air inlet, wherein each of said tube bundles comprises a steam box located on said top; and
    a second airflow inlet located at second vertical position along the vertical axis below said heat exchanger providing a second airflow path for a second airflow,
    wherein said top of said tube bundles is connected to said steam box only and not constrained, said connection to said steam box allowing radial movement of said tube bundles.

2. The apparatus of claim 1, wherein said first airflow path includes a first airflow regulator that translates between an open and closed position to control airflow through said first airflow and second airflow inlets.

3. The apparatus of claim 1, wherein said second airflow path includes a second airflow regulator that translates between an open and closed position to control airflow through said first airflow and second airflow inlets.

4. The apparatus of claim 3, wherein said first airflow regulator is at least one of louvers, roll up doors, hinged doors, sliding doors or any variable structure to regulate airflow.

5. The apparatus of claim 4, wherein said second airflow regulator is at least one of louvers, roll up doors, hinged doors, sliding doors or any variable structure to regulate airflow.

6. The apparatus of claim 4, wherein said second airflow regulator are mounted within the same plane as said cooling tower exterior's shell.

7. The apparatus of claim 1, wherein said heat exchanger is a wet type heat exchanger.

8. The apparatus of claim 1, wherein said heat exchanger is a dry type heat exchanger.

9. The apparatus of claim 1, wherein said heat exchanger is an indirect dry type heat exchanger.

10. The apparatus of claim 1, wherein said tube bundles are finned tube bundles.

11. A method for cooling an industrial fluid using a natural draft cooling tower, the method comprising:
    flowing the industrial fluid to be cooled through a heat exchanger having a top and a bottom, wherein the heat exchanger comprises a plurality of tube bundles arranged in a circular arrangement about the perimeter of the tower and positioned adjacent a first airflow inlet at a first vertical position to induce heat exchange, wherein each of said tube bundles comprises a steam box located on said top and wherein said top of said tube bundles are connected to said steam box only and not constrained, said connection to the steam box allowing radial movement of said tube bundles;
    flowing a second airflow through a second airflow inlet located at a second vertical position below the heat exchanger, bypassing the heat exchanger; and mixing said first airflow and said second airflow as said first airflow exits said heat exchanger.

12. The method of claim 11 further comprises operating an airflow regulator on said second airflow inlet that translates between an open and closed position.

13. The apparatus of claim 11, wherein said tube bundles are finned tube bundles.

14. A natural draft cooling tower that cools an industrial fluid, comprising:
- a tower having a perimeter that extends vertically about a vertical axis through which an airstream flows;
- a heat exchanger disposed proximate said tower, wherein, the industrial fluid and airstream flow there through; said exchanger comprising of a plurality of tube bundles having a top and a bottom arranged in a circular arrangement about the perimeter of the tower positioned adjacent to a first airflow inlet such that the first airflow enters and passes through said heat exchanger prior to entering said first air inlet, wherein each of said tube bundles comprises a steam box located on said top, wherein said top of said tube bundles is connected to said steam box only and not constrained, said connection to steam box allowing radial movement of said tube bundles;
- a chimney section; and
- a base section with an airflow inlet,
- wherein said first airflow inlet located at a first position along the vertical axis below said heat exchanger and a second airflow inlet path located at a second position along the vertical axis below said heat exchanger.

15. The apparatus of claim 14, wherein said first airflow path includes a first airflow regulator that translates between an open and closed position to control airflow through said inlets and wherein said second airflow path includes a second airflow regulator that translates between an open and closed position to control airflow through said inlets.

* * * * *